United States Patent [19]
Sutton et al.

[11] Patent Number: 5,904,447
[45] Date of Patent: May 18, 1999

[54] DRIVE DEVICE USED FOR SOIL STABILIZATION

[75] Inventors: Julie K. Sutton; Michael R. Ludwig, both of Denver, Colo.; Stan Rupiper, Tahoma, Calif.

[73] Assignee: Integrated Stabilization Technologies Inc., Denver, Colo.

[21] Appl. No.: 08/887,151

[22] Filed: Jul. 2, 1997

[51] Int. Cl.[6] .............................. E02D 5/18; C09K 17/00
[52] U.S. Cl. ........................ 405/263; 405/266; 405/269; 175/323
[58] Field of Search .................................. 405/244, 266, 405/269, 263; 166/105, 105.2, 107, 108; 175/323, 394

[56] References Cited

U.S. PATENT DOCUMENTS

| | | | |
|---|---|---|---|
| 2,058,798 | 10/1936 | Hughes | 166/105 X |
| 2,982,355 | 5/1961 | Rodgers | 166/105 |
| 3,243,962 | 4/1966 | Ratliff | 405/266 |
| 3,530,675 | 9/1970 | Turzillo | 405/266 X |
| 3,604,214 | 9/1971 | Turzillo | 175/323 X |
| 4,074,735 | 2/1978 | McCabe et al. | 405/269 X |
| 4,659,259 | 4/1987 | Reed et al. | 405/269 X |
| 5,038,870 | 8/1991 | Kuronen | 175/323 X |
| 5,217,327 | 6/1993 | Nakanishi | 405/269 |

FOREIGN PATENT DOCUMENTS

| | | | |
|---|---|---|---|
| 3737259 | 3/1989 | Germany | 405/269 |

Primary Examiner—Tamara Graysay
Assistant Examiner—Jong-Suk Lee
Attorney, Agent, or Firm—Edwin H. Crabtree; Ramon L. Pizarro; Donald W. Margolis

[57] ABSTRACT

A drive device for injecting different types of fluids, chemicals and slurries into a subsurface for soil stabilization and removing fluids from the subsurface prior to treating a soil. The device is designed to be self advancing into the soil. When the driving of the device in the ground surface is completed, the device can be removed or it can be left in place for forming an anchor or load carrying pier. The device includes a plurality of external and internal hollow pipe sections. The pipe sections are joined together with couplings. Each coupling includes perforations therein and helices around the exterior surface of the coupling. The helices are used for driving the pipe sections into the ground. The perforations in each coupling are used for introducing fluids under pressure into the soil or for extracting fluids from the subsurface. The fluids are pumped under pressure between the inner circumference of the external pipe section and the outer circumference of the internal pipe section and out the perforations in the coupling. The internal pipe section may have a hollow cross section or a solid cross section for increased loading capacity. An upper end of the external pipe section includes a drive cap for accepting various types of torque and percussion drives for drilling the device into different types of soils. A lower end of a lead external pipe section includes a cutter head, a helix, a drill point and the like for advancing downwardly into the soil.

20 Claims, 3 Drawing Sheets

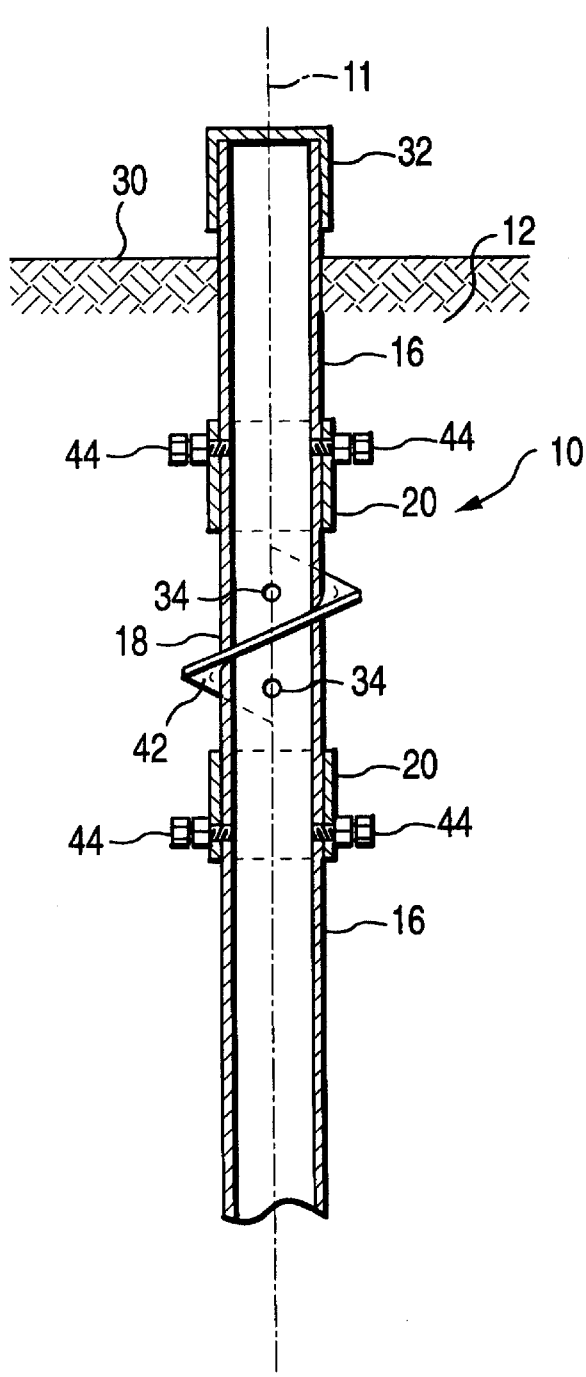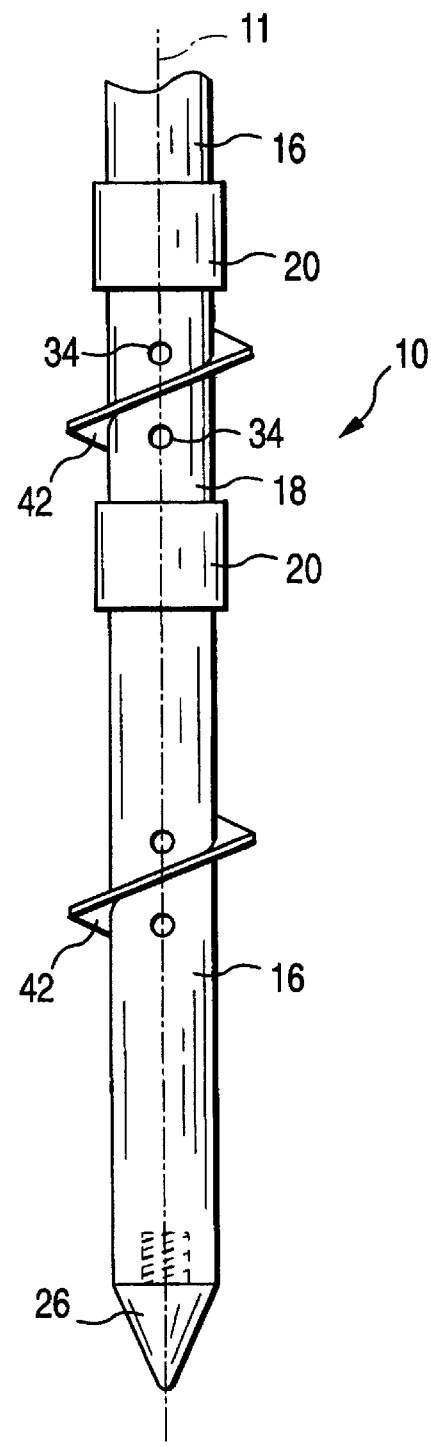
FIG.4
FIG.5

DRIVE DEVICE USED FOR SOIL STABILIZATION

BACKGROUND OF THE INVENTION (a) Field of the Invention

This invention relates to a drive device for use in stabilizing different types of soils and more particularly, but not by way of limitation, to a device for injecting various types of fluids into a subsurface and removing contaminates from the soil. The drive device is removable and reusable or it can be left in place to be used in conjunction with grout and similar materials for forming an anchor or load carry pier.

(b) Discussion of Prior Art

Heretofore there have been a variety of different types of helical plate bearing anchors mounted on solid steel bar shafts and pipe shafts with plate helices that are drilled into soil and used as tension, compression and lateral force resisting members. These types of anchors do not provide a means for injecting fluids into the subsurface.

Also, there are many types of hollow drill rods and drill shafts used for circulating water, drill mud and the like during a drilling operation. The drill rods and shafts can be used with grout in forming tiebacks, mini-piles, rock anchors, soil nails and other micro pile uses. The usual exterior diameter of the rods and shafts are less than 2 inches.

Further, there are various types of auger tools made in the United States. The auger tools are used for excavating holes and may be used for collecting soil samples. This type of tool may have either a solid or hollow shaft with a disposable drill head. Also flight augers have continuous helices along the length of the shaft. Because of the expense of this type of auger, the auger is generally removed from a drill hole and not left in place to be used with grout in forming a mini-pile.

Still further, many steel piles are installed today using pipe of various sizes and weights. The load carrying capacity of this type of pile is usually developed by skin friction and/or point bearing. The steel piles are driven by a pile driving hammer or by boring a hole and placing grout around the exterior of the steel pile received in the hole.

In U.S. Pat. No. 5,575,593 to Raaf, a method and apparatus for installing a helical pier with pressurized grouting is disclosed. The patent describes the forming of grout nodules attached to an exterior of a pier column. The pier column includes a bracket for securing the column to a building foundation. The Raaf pier column is not designed to be reusable nor is it used for extracting fluids from a subsurface.

In U.S. Pat. No. 4,009,582 to LeCorgne, a method is described for forming a caseless concrete pile using a hollow pipe, a connector and a tubular driving mandrel. In U.S. Pat. No. 3,512,366 to Turzillo, a hollow auger for drilling holes is disclosed. The auger described in the Turzillo patent is withdrawn from the hole leaving a steel rod with drill bit in place with concrete poured therearound for forming a concrete pier.

In U.S. Pat. Nos. 4,492,493 and 4,756,129 to Webb and 3,115,226 to Thompson, Jr. different types of ground anchors and apparatus are described. Also, U.S. Pat. Nos. 4,998,849 to Summers, 3,961,671 to Adams et al. and 4,678,373 to Langenbach, Jr. disclose different types of driving apparatus and methods of shoring structures.

None of the above patents disclose or teach the unique combination of structure and functions of the subject soil stabilization tool as described herein and it's variety of uses in treating different types of soils.

SUMMARY OF THE INVENTION

In view of the foregoing, it is a primary object of the present invention to provide a drive device which is adaptable for injecting different types of fluids, chemicals, slurries and the like into a subsurface for soil stabilization. The device can also be used for drawing liquid and gas contaminates from the soil. The external and internal pipes pipe sections are hollow for receiving a submersible pump or a packer assembly therein.

Another object of the invention is the device is self advancing when rotated into the soil from a few feet to depths of 20 to 30 feet and greater. The device can be increased in size to suit nearly all soil and load conditions.

Still another object of the subject invention is to provide a rugged yet inexpensive drilling tool that is removable and reusable. Also, the drive device can be left in place and grouted for forming an anchor or load carry pier or it can be used as a grout dispenser. The device includes couplings of different sizes with perforations therein and helices on the exterior surface of the couplings. The couplings can be used with different lengths and diameters of external and internal pipe sections for easy adaption to different types of soil stabilization operations.

A further object of the unique tool is the device can be turned into soil material with a relatively small amount of torque and still achieve resistance to forces in most penetrated materials much greater than other prior art devices rotated into the same type of material with less weight components. The device is designed to inject solidifying material that combines with the penetrated soil for forming a composite structure of desired strength for resisting applied axial and/or lateral loads thereon.

Yet another object of the invention is the device can be driven into the ground surface using different types of torque and percussion drilling machines. Also the tool, depending on the type of soil and it's hardness, may be advanced using a cutter head, helix, drill point and like drilling bits. The tool may include a drill head with a helice therearound for aid in advancing into various types of soils.

The subject drive device includes a plurality of external hollow pipe sections and internal pipe sections. The pipe sections are joined together with couplings. Each coupling includes perforations therein and helices around the exterior surface of the coupling. The helices are used for driving the pipe sections into the ground. The perforations in each coupling are used for introducing fluids under pressure into the soil or for extracting fluids from the subsurface. The fluids can be pumped under pressure between the inner circumference of the external pipe section and the outer circumference of the internal pipe section and out the perforations in the coupling. The internal pipe section may have a hollow cross section or a solid cross section, A solid cross section internal pipe may be used for increased loading and when the device is used as a load bearing pier or anchor. An upper end of the external pipe section includes a drive cap for accepting various types of torque and percussion drives for drilling the device into different types of soils. A lower end of a lead external pipe section includes a cutter head, a helix, a drill point and the like for advancing downwardly into the soil. The pipe sections and couplings are adapted for receiving internally a submersible pump for extracting fluids and for receiving a packer assembly for injecting fluids into the subsurface.

These and other objects of the present invention will become apparent to those familiar with soil stabilization equipment and methods of treating soil from the following detailed description, showing novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 4 is an enlarged front view of an upper portion of one of the exterior pipe sections attached to a coupling. The pipe section and coupling are shown in cross section.

FIG. 5 is an enlarged front view of a coupling and a lead exterior pipe section with a drill point attached to the end of the pipe section. The drill point include a helice therearound.

DESCRIPTION OF THE PREFERRED EMBODIMENTS

Figure 1:
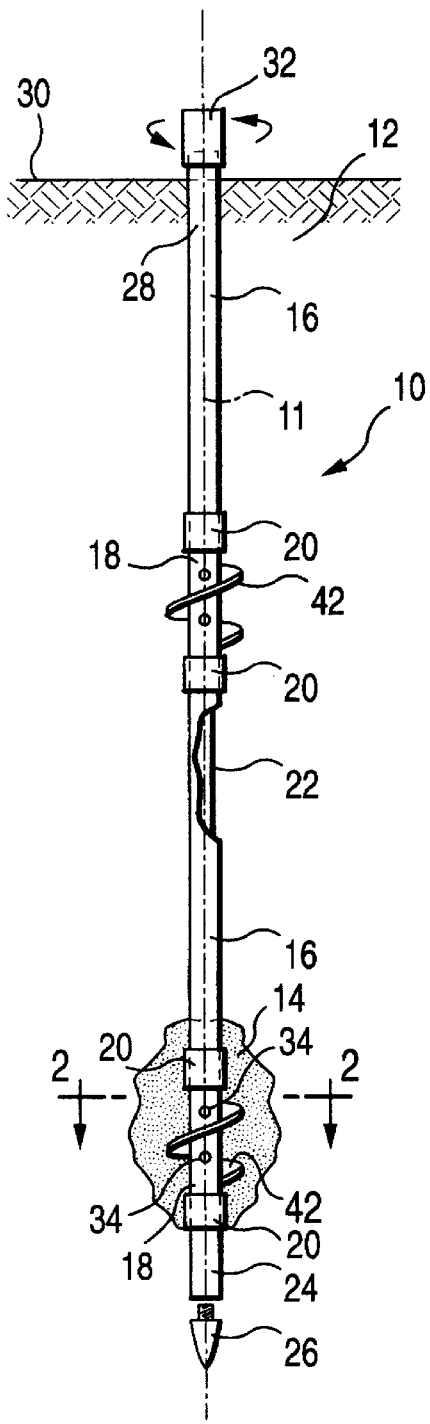
FIG. 1 is a front view of the subject soil stabilization device having been driven to a selected depth and a portion of the surrounding soil grouted along a portion of the length of an external pipe section.

In FIG. 1, a front view of the subject soil stabilization device is shown having a general reference numeral 10. The device 10 has been driven to a selected depth in a subsurface 12 and grouted a portion 14 of the surrounding soil. The subject drive tool is identified by a brand name "TURBOPIER" and owned by the assignee of record. The device 10 includes a plurality of external pipe sections 16 attached to opposite ends of a coupling 18 using connecting sleeves 20. The device 10 is shown with a center line 11 through the center and along the length of the pipe sections 16. The diameter and lengths of the external pipe section 16 will vary depending on the application. Received inside the external pipe section 16 is a first internal pipe section 22 having opposite ends threaded together for joining different lengths of the internal pipe sections 22. In this drawing, a portion of one of the external pipe sections 16 is shown cut away to expose one of the first internal pipe sections 22 therein.

In this drawing, the device 10 is shown with a pair of couplings 18 attached to a pair of external pipe sections 16. The lower coupling 18 is attached using a connecting sleeve 20 to a pipe extension drill pipe section 24 with a drill point 26 threaded into the lower end of the pipe extension 24. While the drill point 26 is shown in the drawings, other types of drill bits, cutter heads, augers and the like can be used and attached to the pipe extension 24 for drilling into various types of soils. An upper end 28 of the external pipe section 24 next to a ground surface 30 is attached to a drive cap 32. The drive cap 32 is adapted for attachment to a rotary torque drive, a percussion drill, a jacking apparatus, a vibratory driving device, water jetting and like drilling equipment used with the subject device 10 for penetration to depths of 20 to 30 feet and greater into the subsurface. The drive cap 32 is also adaptable for accepting air pressure, hydraulic pressure, expanded foam pressure along with swivels, flexible couplings, grout and foam tubes and other plumbing arrangements for injecting and extracting fluids from the external and internal pipes 16 and 22.

The grouted portion 14 may be uniform along a portion of the length of external pipes 16 or bulbous as shown in the drawing. The grout may be continuous along the entire length of the drive device or intermittent at various locations along the length of the drive device. The location and amount of the injected grout depends on the soil condition, the area of soil needing to be stabilized and/or anchor or load bearing pier requirements.

Figure 2:
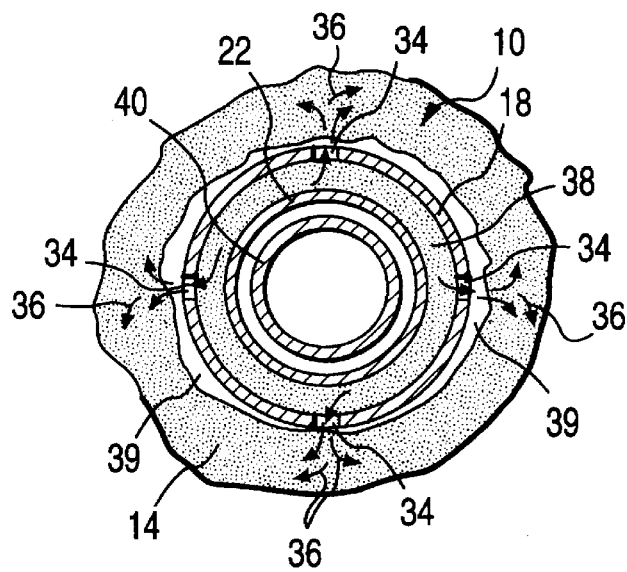
FIG. 2 is an enlarged cross sectional view of a portion of an external pipe section and an internal pipe section taken along lines 2—2 shown in FIG. 1.

In FIG. 2, an enlarged cross sectional view of a portion of one of the couplings 18 and a first internal pipe section 22 is taken along lines 2—2 as shown in FIG. 1. In this view, the coupling 18 is shown with perforations 34 and grout, indicated by arrows 36, being pumped under pressure outwardly from a space 38 between the outer circumference of the internal pipe section 22 and the inner circumference of the coupling 18. The couplings 18 and external pipe sections 16 may be used alone for injecting grout, chemicals and like soil stabilization products or with internal pipe sections 22. The grout may be a slurry of cement, bituminous, epoxy, polyurethane and various other fluid materials used in treating unstable soils and will vary depending on the soil to be treated. Also second internal pipe sections 40, having a smaller diameter than the first internal pipe sections 22, may be used if desired for additional strength. Also, the pipe sections 40 may be hollow or of a solid material and may be of any design size with the largest size completely filling the external pipe 16 and the couplings 18. The pipe section 40 shown in FIG. 2 is hollow. The interior of the pipe sections 16, 22 and 40 may be filled with grout if necessary when using the device 10 as a permanent load bearing pier or anchor and increased loads are placed thereon.

A lubricant 39 such as foam, drilling mud, bitumen, soil composition bentonite and the like may be placed around the exterior surface of the couplings 18 and exterior pipe sections 16 to provide less friction when the device 10 self advances into the ground surface.

It should be noted that FIG. 2 illustrated a concentric cross section of the pipe sections 22 and 40 and coupling 18. The device 10 may also have non-concentric cross sections with different geometric configurations of the external pipe sections 18, the internal pipe sections 22 and 40 along with the couplings 18. The non-concentric cross sections of the pipe sections are not shown in the drawings.

Figure 3:
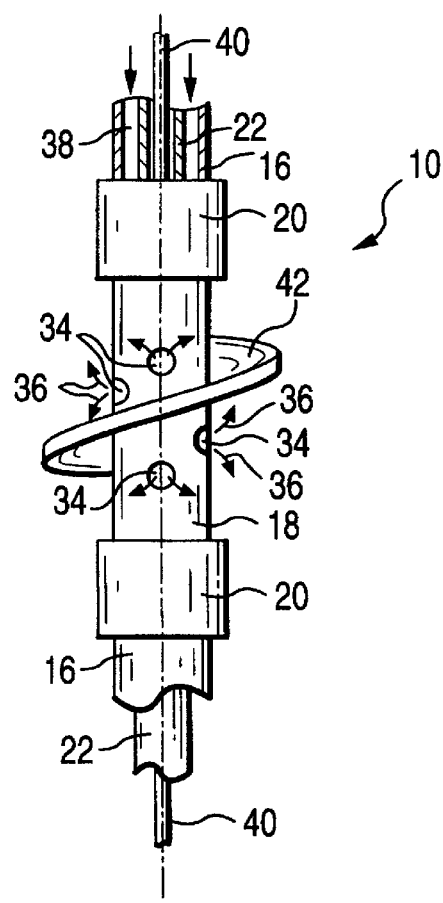
FIG. 3 is an enlarged front view of the device's coupling having perforations therein and a helice disposed around the exterior surface of the coupling.

In FIG. 3, an enlarged front view of the device's coupling 18 with perforations 34 therein is shown. The coupling 18 is shown connected to an upper and lower external pipe section 16 using the connecting sleeves 20. Each coupling 18 is unique in that it includes a helice 42 disposed around an exterior surface of the coupling 18. The pitch angle of the helice 42 will vary depending on the application. Also a flat bearing plate at a 90 degree angle to the center line 11 of the device 10 may be used if a helice 42 is not used. The helice 42 is of importance in allowing the device 10 to be self advancing as the drive device is established downwardly into the subsurface 12. The helice 42, on the coupling 18, provide for greater flexibility and at less expense then welding one or more helice 42 along the length of external pipe sections 16. The coupling 18 with helice 42 can be added to various lengths and sizes of external pipe for proper location of the coupling 18 when treating certain zones of soil at an exact depth from the ground surface 30. Also, the couplings 18 with helice 42 can be left in the ground when forming an anchor or load bearing pier with grout or the couplings 18 can be removed and reused at a later date. Further, the couplings 18 with perforations 34 can be used for extracting liquids and gases from the subsurface.

In FIG. 4, an enlarged front view of an upper portion of one of the exterior pipe sections 16 is shown next to the ground surface 30 and attached to a coupling 18. As mentioned above, the exterior pipe sections 16 may vary in diameter and in length. The couplings 18 may be attached with threaded sleeves 20 threaded to the ends of the pipe sections 16 and the ends of the couplings 18. Also, the sleeves 20 may be welded to the couplings 18 and attached to the exterior pipe sections using set screws 44 as shown in this drawing. Obviously, a variety of different types of fasteners may used in this application for releasably attaching the sleeves 20 to the pipe sections 16 and to the couplings 18.

In FIG. 5, an enlarged front view of a coupling 18 and a lead exterior pipe section 16 is shown. The pipe section 16 includes the drill point 26 attached to a lower end of the section 16. In this drawing, the lead exterior pipe section 16 includes a helice 42 attached to it's outer surface. By using both an exterior pipe section 16 with drill point 26 or the like having a helice 42 along with the couplings 18 having helices 42, the overall length of the device 10 can include any number of helices 42 for increased lateral and vertical stability and strength for an anchor or load carrying pier.

Figure 6:
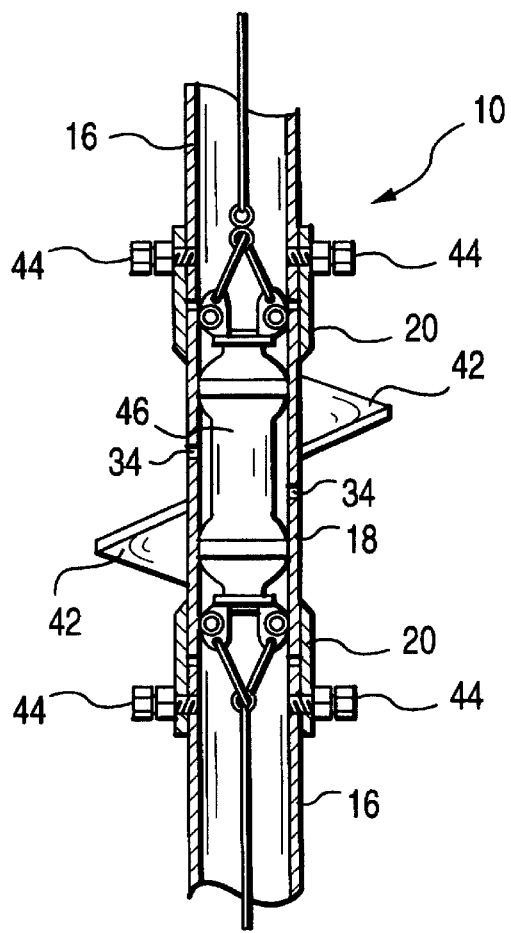
FIG. 6 is a cross sectional view of a coupling with a prior art packer assembly received inside the coupling. The packer assembly is used for injecting various type of chemical outwardly through perforations in the sides of the coupling.

In FIG. 6, a cross sectional view of one of the couplings 18 with helice 42 is shown with a packer assembly 46 received inside the coupling 18. The packer assembly 46 is received inside the exterior pipe sections 16 and couplings 18 rather than pumping different types of fluids from connections to the drill cap 32 at the ground surface 30. The packer assembly 46 is used for injecting various types of chemicals, grout and other slurries outwardly and through the perforations 34 in the coupling 18 and into the subsurface 12 for soil stabilization. While the packer assembly 46 is shown in the drawings, a submersible pump may also be received inside the exterior pipe sections 16 and one of the couplings 18 for drawing and extracting contaminates from subsurface 12.

Figure 7:
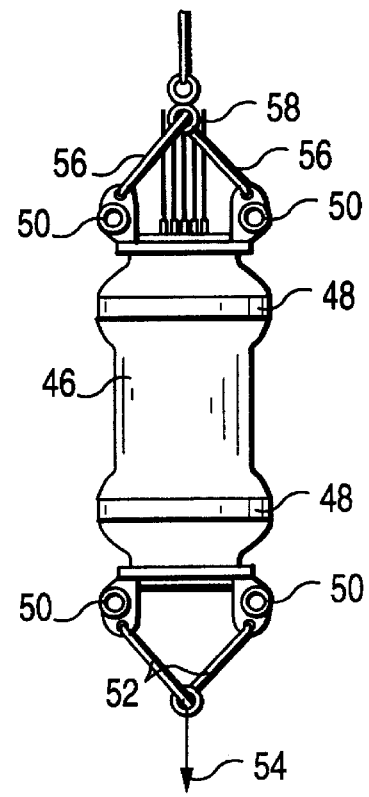
FIG. 7 is a front view of the packer assembly with packer wheels and tow cables.

In FIG. 7, a front view of the packer assembly 46 is shown removed from the coupling 18. The packer assembly 46 broadly includes packer sleeves 48 which for holding the assembly 46 inside the coupling 18, packer wheels 50 used to guide the assembly 46 inside the external pipe sections 16, a tow cable 52 with weight, indicated by arrow 54, used to lower the assembly 46 and a line cable 56 with air and chemical line housing 58 which runs upwardly to the ground surface 30.

Figure 8:
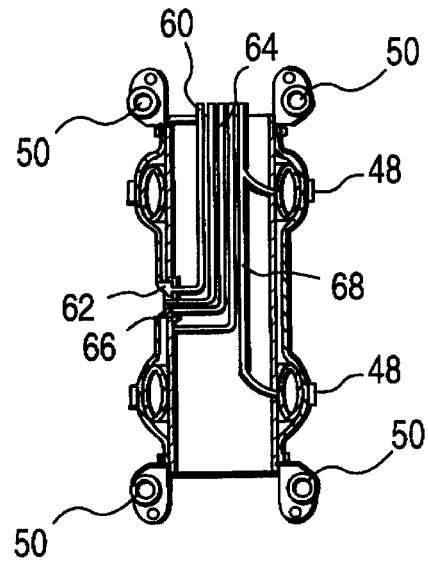
FIG. 8 is a cross sectional view of the packer assembly illustrating sleeve air lines and chemical injection ports for introducing fluids into the interior of the coupling.

In FIG. 8, a cross sectional view of the packer assembly 46 is shown illustrating a pressure sensor line 60 with sensor 62, a chemical line 64 with injection port 66, and a packer sleeve air line 68 for inflating the packer sleeves 48. The packer assembly 46 is shown in the drawings as an example of the flexibility of the device 10 for injecting fluids inside the coupling 18 and at various depths in the subsurface 12 for soil stabilization.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A drive device for injecting different types of fluids, chemicals, slurries into a subsurface for soil stabilization and for removing fluids from the subsurface prior to treating a soil, the drive device comprising:

a plurality of external hollow solid wall pipe sections having an open top end and an open bottom end; and at least one coupling for joining adjacent to external wall pipe section, said coupling having perforations therein and a helice around an exterior surface of said coupling, said helice used for driving said external pipe sections into the ground, said perforations in said coupling adapted for introducing fluids under pressure into the soil and for extracting fluids from the subsurface.

2. The device as described in claim 1 further including a plurality of internal pipe sections, said internal pipe sections interconnected and received inside said external pipe sections.

3. The device as described in claim 2 wherein said internal pipe sections have a hollow cross section.

4. The device as described in claim 2 wherein said internal pipe sections have a solid cross section.

5. The device as described in claim 1 wherein said coupling includes sleeves for attaching said coupling to said external pipe sections.

6. A drive device for injecting different types of fluids, chemicals, slurries into a subsurface for soil stabilization and for removing fluids from the subsurface prior to treating a soil, the device comprising:

a plurality of external hollow pipe sections;

a plurality of couplings for joining said external pipe sections, said couplings having perforations therein and a helice disposed around an exterior surface of said couplings, said helice used for driving said external pipe sections into the ground, said perforations in said couplings adapted for introducing fluids under pressure into the soil and for extracting fluids from the subsurface; and a drill pipe section with a drill thereon, said drill pipe section connected to one end of one of said external pipe sections using one of said couplings.

7. The device as described in claim 6 further including a drill pipe section helice disposed around an exterior surface of said drill pipe section.

8. The device as described in claim 6 further including a plurality of first internal pipe sections, said first internal pipe sections interconnected and received inside said external pipe sections.

9. The device as described in claim 8 further including a plurality of second internal pipe sections, said second internal pipe sections interconnected and received inside said first internal pipe sections.

10. The device as described in claim 9 wherein said second internal pipe sections have a hollow cross section.

11. The device as described in claim 9 wherein said second internal pipe sections have a solid cross section.

12. The device as described in claim 6 further including a drive cap mounted on one end of an external pipe section, said drive cap adapted for accepting various types of torque and percussion drives for driving the device into different types of soils.

13. The device as described in claim 6 wherein said drill attached to said drill pipe section is selected from the group consisting of a cutter head, a helix, a drill point for advancing downwardly into the soil.

14. A drive device for injecting different types of fluids, chemicals, slurries into a subsurface for soil stabilization and for removing fluids from the subsurface prior to treating a soil, the device comprising:

a plurality of external hollow pipe sections;

a plurality of couplings for joining said external pipe sections, said couplings having perforations therein and a helice disposed around an exterior surface of said couplings, said helice used for driving said external pipe sections into the ground, said perforations in said couplings adapted for introducing fluids under pressure into the soil and for extracting fluids from the subsurface;

a plurality of first internal pipe sections, said first internal pipe sections interconnected and received inside said external pipe sections; and a drill pipe section with a drill thereon, said drill pipe section connected to one of said external pipe sections using one of said couplings.

15. The device as described in claim 14 further including a drill pipe section helice disposed around an exterior surface of said drill pipe section.

16. The device as described in claim 14 further including a plurality of second internal pipe sections, said second internal pipe sections interconnected and received inside said first internal pipe sections.

17. The device as described in claim 16 wherein said second internal pipe sections have a hollow cross section.

18. The device as described in claim 16 wherein said second internal pipe sections have a solid cross section.

19. The device as described in claim 14 further including a drive cap mounted on one end of one of said external pipe sections, said drive cap adapted for accepting various types of torque and percussion drives for driving the device into different types of soils.

20. The device as described in claim 14 wherein said drill attached to said drill pipe section is selected from the group consisting of a cutter head, a helix, a drill point for advancing downwardly into the soil.

\* \* \* \* \*